(12) United States Patent
Kitazawa et al.

(10) Patent No.: US 11,733,200 B2
(45) Date of Patent: Aug. 22, 2023

(54) ELECTROCHEMICAL OXYGEN SENSOR

(71) Applicant: Maxell, Ltd., Kyoto (JP)

(72) Inventors: Naohisa Kitazawa, Kyoto (JP); Emi Kuromatsu, Kyoto (JP); Tadashi Kakeya, Kyoto (JP)

(73) Assignee: MAXELL, LTD., Kyoto (JP)

( * ) Notice: Subject to any disclaimer, the term of this patent is extended or adjusted under 35 U.S.C. 154(b) by 278 days.

(21) Appl. No.: 17/273,553

(22) PCT Filed: Oct. 17, 2018

(86) PCT No.: PCT/JP2018/038621
§ 371 (c)(1),
(2) Date: Mar. 4, 2021

(87) PCT Pub. No.: WO2020/079769
PCT Pub. Date: Apr. 23, 2020

(65) Prior Publication Data
US 2021/0255135 A1   Aug. 19, 2021

(51) Int. Cl.
*G01N 27/404* (2006.01)
*G01N 27/30* (2006.01)
*G01N 27/413* (2006.01)

(52) U.S. Cl.
CPC .......... *G01N 27/404* (2013.01); *G01N 27/30* (2013.01); *G01N 27/413* (2013.01)

(58) Field of Classification Search
CPC ..... G01N 27/404; G01N 27/30; G01N 27/413
See application file for complete search history.

(56) References Cited

U.S. PATENT DOCUMENTS

| | | | |
|---|---|---|---|
| 4,495,051 A * | 1/1985 | Fujita | G01N 27/404 204/414 |
| 2003/0033848 A1* | 2/2003 | Peng | G01N 27/4163 73/1.06 |
| 2007/0227909 A1 | 10/2007 | Sommer et al. | |
| 2010/0252432 A1 | 10/2010 | Kitazawa | |
| 2019/0219535 A1 | 7/2019 | Kitazawa | |

FOREIGN PATENT DOCUMENTS

| | | |
|---|---|---|
| JP | 52-127392 A | 10/1977 |
| JP | 58-187846 A | 11/1983 |
| JP | 60-91253 A | 5/1985 |

(Continued)

OTHER PUBLICATIONS

EPO computer-generated English language Kitazawa Naohisa JP 2018109549 A, patent published (Year: 2018).*

(Continued)

*Primary Examiner* — Alexander S Noguerola
(74) *Attorney, Agent, or Firm* — WHDA, LLP

(57) ABSTRACT

An electrochemical oxygen sensor with a long service life is provided. The electrochemical oxygen sensor according to the present invention includes a positive electrode, a negative electrode, and an electrolyte solution, and the electrolyte solution contains a chelating agent and ammonia, and a concentration of the ammonia in the electrolyte solution is 0.01 mol/L or higher. Citric acid is preferable as the chelating agent contained in the electrolyte solution. Also, the negative electrode preferably contains an Sn alloy.

18 Claims, 1 Drawing Sheet

(56) References Cited

FOREIGN PATENT DOCUMENTS

| JP | 9-292362 A | 11/1997 |
| JP | 2018-109549 A | 7/2018 |
| WO | 2009/069749 A1 | 6/2009 |

OTHER PUBLICATIONS

Notice of Reasons for Refusal dated Feb. 16, 2021, issued in counterpart JP Patent Application No. 2020-551644, w/English translation (7 pages).
International Search Report dated Dec. 25, 2018, issued in counterpart International Application No. PCT/JP2018/038621 (2 pages).
Office Action dated Aug. 20, 2021, issued in counterpart EP Application No. 18 936 948.1. (6 pages).

\* cited by examiner

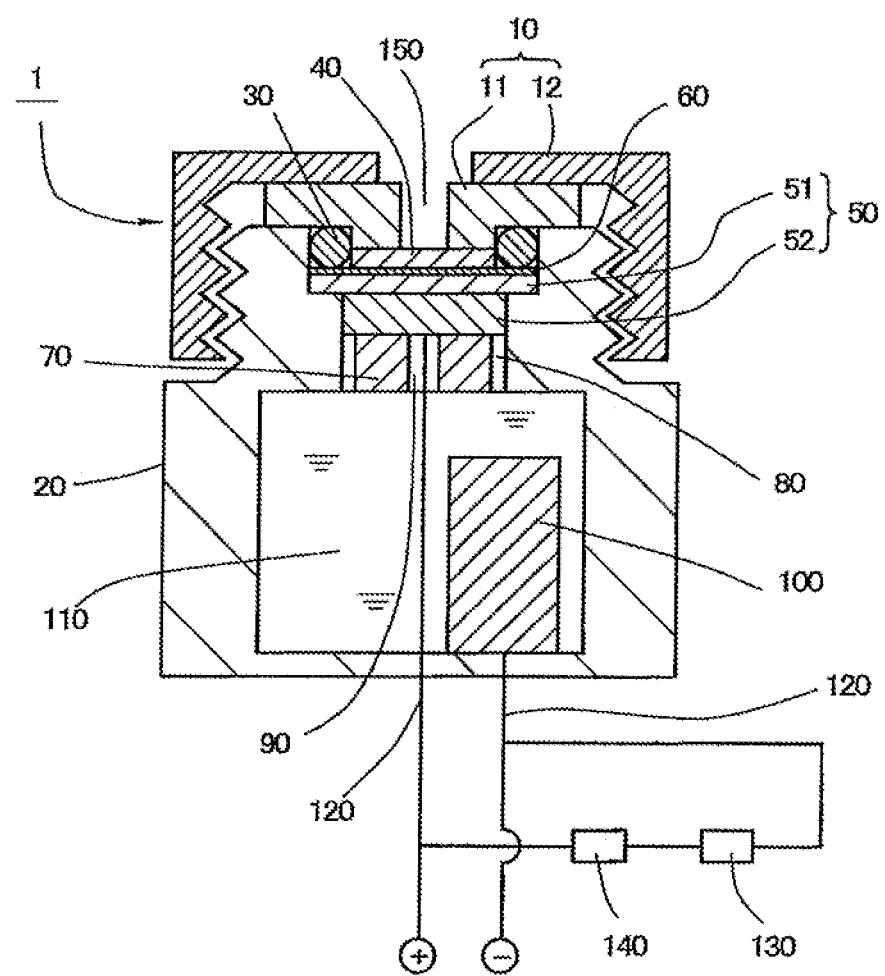

ELECTROCHEMICAL OXYGEN SENSOR

TECHNICAL FIELD

The present invention relates to an electrochemical oxygen sensor with a long service life.

BACKGROUND ART

Electrochemical oxygen sensors (also referred to as "oxygen sensors" hereinafter) are advantageous in that they are inexpensive and convenient and can be operated at room temperature. Thus, these oxygen sensors have been used widely in various fields for checking the degree of oxygen deficiency in holds of ships and in manholes and for detecting the oxygen concentration in medical equipment such as anesthesia apparatuses and respirators.

As such an electrochemical oxygen sensor, for example, Patent Document 1 discloses an electrochemical oxygen sensor that includes a cathode, an anode, and an electrolyte solution, in which the electrolyte solution contains a chelating agent and has a pH of 12 or more.

Also, Patent Document 2 discloses that the service life of an oxygen sensor can be improved by setting a molar concentration of a chelating agent in an electrolyte solution of an electrochemical oxygen sensor to 1.4 mol/L or higher.

PRIOR ART DOCUMENTS

Patent Document

[Patent Document 1] WO 2009/069749
[Patent Document 2] JP 2018-109549A

DISCLOSURE OF INVENTION

Problem to be Solved by the Invention

According to the technique disclosed in Patent Document 1, while an electrochemical oxygen sensor with a high response speed can be provided, there is still room to improve the service life thereof. Also, the technique disclosed in Patent Document 2 contributes to improving the service, life of the oxygen sensor, but the effect thereof is limited, and a further extension of the service life thereof is required.

The present invention was made in view of the above-described circumstances, and aims to provide an electrochemical oxygen sensor with a long service life.

Means for Solving Problem

The electrochemical oxygen sensor according to the present invention includes a positive electrode, a negative electrode and an electrolyte solution, and the electrolyte solution contains a chelating agent and ammonia, and a concentration of the ammonia in the electrolyte solution is 0.01 mol/L or higher.

Effects of the Invention

According to the present invention, it is possible to provide an electrochemical oxygen sensor with a long service life.

BRIEF DESCRIPTION OF DRAWINGS

FIG. 1 is a cross-sectional view schematically showing one example of an electrochemical oxygen sensor according to the present invention.

DESCRIPTION OF THE INVENTION

First, an electrochemical oxygen sensor according to the present invention will be described with reference to the drawing, using, as an example, a galvanic cell type oxygen sensor, which is a suitable embodiment.

FIG. 1 is a cross-sectional view schematically showing a galvanic cell type oxygen sensor according to one embodiment of the electrochemical oxygen sensor.

An oxygen sensor 1 shown in FIG. 1 has a positive electrode 50, a negative electrode 100, and an electrolyte solution 110 in a tubular holder 20 having a bottom. A holder lid 10 having a through-hole 150 for taking oxygen into the oxygen sensor 1 is attached to an upper opening portion of the holder 20 via an O-ring 30, the holder lid 10 being constituted by a first holder lid (inner lid) 11 and a second holder lid (outer lid) 12 for fixing the first holder lid 11.

The negative electrode 100 is arranged in a tank in the holder 20 in a state in which the negative electrode 100 is immersed in the electrolyte solution, the tank storing the electrolyte solution 110. A lead wire 120 is attached to the negative electrode 100, and a correction resistor 130 and a temperature compensation thermistor 140 are connected in series to this lead wire 120 outside the holder 20. Also, the positive electrode 50 is composed by stacking a catalytic electrode 51 and a positive electrode current collector 52, and the lead wire 120 is also attached to the positive electrode current collector 52. Also, the positive electrode 50 is arranged above the electrolyte solution storage tank via a positive electrode current collector holding portion 70. Also, the positive electrode current collector holding portion 70 is provided with a bore 80 for supplying the electrolyte solution 110 stored in the electrolyte solution storage tank to the positive electrode 50, and a bore 90 for allowing the lead wire 120 attached to the positive electrode current collector 52 to pass through.

A barrier membrane 60, which selectively allows oxygen to pass therethrough and limits the amount of oxygen passing therethrough to match a cell reaction, is arranged on an upper portion of the positive electrode 50, and oxygen passing through the through-hole 150 provided in the holder lid 10 is introduced into the positive electrode 50 through the barrier membrane 60. Also, a protective film 40 for preventing dirt, dust, water, or the like from adhering to the barrier membrane 60 is arranged on an upper portion of the barrier membrane 60, and is fixed by the first holder lid 11.

That is, the first holder lid 11 functions as a pressing end plate for pressing the protective film 40, the barrier membrane 60, and the positive electrode 50. In the sensor 1 shown in FIG. 1, a threaded portion is formed on an inner circumferential portion of the second holder lid 12 to be screwed onto a threaded portion formed on an outer circumferential portion of the holder 20. Then, the first holder lid 11 is pressed against the holder 20 via the O-ring 30 by screwing the holder lid 10 on, and thus, the protective film 40, the barrier membrane 60, and the positive electrode 50 can be fixed to the holder 20 in a state in which airtightness and liquid tightness are maintained.

The operating principle of the galvanic cell type oxygen sensor having an electrolyte solution containing a chelating agent as described in Patent Document 1 is considered as follows, which is explained with reference to FIG. 1.

Oxygen that has passed through the barrier membrane 60 and has entered the inside of the oxygen sensor 1 is reduced by the catalytic electrode 51 of the positive electrode 50, and causes the following electrochemical reaction with the negative electrode 100 via the electrolyte solution 110. Note that, while the negative electrode 100 is composed of various metals or alloys that will be described as specific examples later, the following is in a case where the negative electrode 100 is composed of Sn or an Sn alloy as an example in the electrochemical reaction equations below.

Positive electrode reaction: $O_2 + 4H^+ + 4e^- \rightarrow 2H_2O$

Negative electrode reaction: $Sn + 2H_2O \rightarrow SnO_2 + 4H^+ + 4e^-$ $Y^{x-} + SnO_2 + 4H^+ \rightarrow YSn^{4-x} + 2H_2O$ :Y represents a chelating agent A current corresponding to the oxygen concentration is generated between the catalytic electrode 51 and the negative electrode 100 through this electrochemical reaction. The current generated by the positive electrode reaction at the catalytic electrode 51 is collected by the positive electrode current collector 52 that is pressed against the catalytic electrode 51, is guided by the lead wire 120 to the outside, and flows to the negative electrode 100 through the correction resistor 130 and the temperature compensation thermistor 140. Accordingly, the current is converted into a voltage signal, and a voltage can be obtained as the output of the oxygen sensor. Then, the obtained output voltage is converted into an oxygen concentration using a known method, and is detected as the oxygen concentration.

Note that a constituent metal of the negative electrode 100 is oxidized to produce a metal oxide on the surface of the negative electrode 100 (in the electrochemical reaction equation, the constituent metal of the negative electrode 100 is Sn or an Sn alloy; and the metal oxide generated is $SnO_2$). This metal oxide dissolves in the electrolyte solution, and thus the metal or alloy is newly exposed on the surface of the negative electrode 100, and the exposed metal or alloy is further oxidized through the above-described reaction, and a series of phenomena in which the metal oxide dissolves in the electrolyte solution is repeated (that is, the negative electrode is consumed). By the mechanism described above, the electrochemical reaction continues such that the oxygen concentration is detected by the oxygen sensor of this embodiment.

Here, it is considered that the chelating agent (Y) acts as chelating the constituent metal of the negative electrode to dissolve the chelated metal in the electrolyte solution (referred to as "chelating action" hereinafter). However, the inventors of the present invention thought that, when the concentration of metal that is derived from the negative electrode and is dissolved in the electrolyte solution reaches the saturation concentration, the above-described metal oxide is produced, and thus the negative electrode becomes inactive, which is one of the factors that the service life of an oxygen sensor is shortened.

In view of this, as a result of intensive studies, the inventors of the present invention found that saturation of metal in the electrolyte solution that is derived from the negative electrode and is dissolved in the electrolyte solution can be delayed by increasing the amount of metal that is derived from the negative electrode and can be dissolved in the electrolyte solution, that is, by increasing the molar concentration of the chelating agent (Y) in the electrolyte solution, and as a result, the service life of the oxygen sensor can be improved, thereby completing the present invention.

A "chelating agent" in this specification has molecules (also including ions) having a plural number of functional groups that coordinate with a metal ion, and forms a complex (complexation) with the metal ion, thereby inactivating the metal ion. The chelating agent can be added to an electrolyte solution as an acid or salt thereof that produces the above-described molecules in a solvent that constitutes the electrolyte solution. Therefore, chelating agents in which the number of functional groups described above is one, such as phosphoric acid, acetic acid, carbonic acid, and salts thereof that have low complexing power, are not encompassed in the "chelating agent" described in this specification.

Note that the concentration of ammonia in an electrolyte solution in this specification refers to the concentration of the total amount of ammonia and ammonium ions therein.

In the oxygen sensor of the present invention, an electrolyte solution is used which contains a chelating agent and ammonia, and has a molar concentration of ammonia of 0.01 mol/L or higher, preferably 0.1 mol/L or higher, and more preferably 1 mol/L or higher. Note that the solvent of the electrolyte solution is water. If such an electrolyte solution is used, it is possible to increase the molar concentration of the chelating agent, and improve the service life of the oxygen sensor. The reasons therefor are presumed to be as follows.

Chelating agents usually have chelating action and pH buffer capacity (the capacity to keep the pH of a solution substantially constant even if a small amount of acid or base is added). If acid or salt thereof that has chelating action in an aqueous solution is dissolved in water alone, the pH of the aqueous solution is mainly determined by the type and concentration of the chelating agent. Thus, the pH of an aqueous solution causes progression of galvanic corrosion against the material of the negative electrode depending on the type of chelating agent to be used, thereby making it difficult to use an aqueous solution such as the electrolyte solution of a sensor in some cases.

Therefore, proposals have been made to use a mixed solution containing an acid that serves as a chelating agent and a salt thereof in order to adjust the pH of the electrolyte solution in a suitable range while maintaining high pH buffer capacity. However, there is a limit to increasing the concentration of the chelating agent even if the composition of the mixed solution is adjusted.

On the other hand, although ammonia has weak complex formation action, ammonia acts to increase the solubility of the chelating agent in water to facilitate the adjustment of the pH of the electrolyte solution to a suitable range while maintaining the pH buffer capacity thereof. Therefore, the concentration of the chelating agent in the electrolyte solution can be increased by adding ammonia into the electrolyte solution, and as a result, the concentration of metal ions derived from the negative electrode dissolved in the electrolyte solution can be delayed to reach saturation, and the service life of the oxygen sensor can be unproved.

In order to facilitate the above-described action of ammonia, the concentration of ammonia in the electrolyte solution is set to 0.01 mol/L or higher, and preferably 0.1 mol/L or higher, and more preferably 1 mol/L or higher in order to further increase the action thereof.

On the other hand, although the upper limit of the concentration of ammonia in the electrolyte solution is not particularly specified, ammonia is a compound specified in Appendix 2 of the "Poisonous and Deleterious Substances Control Law" in Japan, and thus, the concentration of ammonia in the electrolyte solution is preferably set to less than 10 mass % from the viewpoint of safety.

The pH of the electrolyte solution of the oxygen sensor is preferably less than 7 (on the acidic solution side) to prevent the influence of carbon dioxide gas, and if multiple pKa values (Ka represents an acid dissociation constant) of the chelating agent are set to $pKa_1$, $pKa_2$, ..., and $pKa_f$ in order from the lowest value, the pH of the electrolyte solution is more preferably set to be in the range of $pKa_f+1$ or less because it is possible to utilize the pH buffer capacity of the electrolyte solution at least in the vicinity of $pKa_f$ when reactions progress at the positive and negative electrodes.

Also, the pH of the electrolyte solution is further preferably set to be in the range of $pKa_{f-1}+1$ or less because it is possible to utilize the pH buffer capacity of the electrolyte solution in the vicinities of $pKa_{f-1}$ and $pKa_f$ in order, accompanying the progression of the reactions at the positive and negative electrodes. Furthermore, setting of the pH of the electrolyte solution to be in the range of $pKa_{f-1}-0.25$ or less is more effective for extending the service life thereof because the pH buffer capacity of the electrolyte solution in the vicinity of $pKa_{f-1}$ can be more easily utilized.

Also, in terms of buffering a change in the pH, it is most preferable to set the pH of the electrolyte solution to be in the range of $pKa_1+1$ or less because it is possible to utilize the full pH buffer opacity of the electrolyte solution in the vicinity of $pKa_1$ to the vicinity of $pKa_f$.

On the other hand, in order to provide the electrolyte solution with pH buffer capacity when starting to use an oxygen sensor, it is preferable to set the pH of the electrolyte solution to be in the range of pKa−1 or more (and pKa+1 or less) for each pKa value, and thus the pH of the electrolyte solution is preferably in a range of ±1 from the center of each pKa value. In particular, it is considered that, if the pH of the electrolyte solution is in a range from pKa−1 to pKa−0.25 on the negative side with respect to the each pKa value, the pH buffer capacity of the electrolyte solution is more likely to be exerted, which is more effective for extending the service life of the oxygen sensor.

Specifically when citric acid is used as a chelating agent, the pKa values of citric acid at 25° C. are as follows: $pKa_1=3.13$, $pKa_2=4.75$, and $pKa_3=6.40$. Therefore, in terms of exerting the pH buffer capacity at least at $pKa_3$, the pH of the electrolyte solution is preferably 7.40 or less, and particularly preferably 6.15 or less. Also, in terms of exerting the pH buffer capacity at $pKa_2$ and $pKa_3$, the pH of the electrolyte solution is further preferably 5.75 or less, and particularly preferably 4.5 or less, and in terms of exerting the pH buffer capacity at $pKa_1$ to $pKa_3$, most preferably 4.13 or less. Note that, in the case of citric acid, the range of $pKa_1\pm 1$ and the range of $pKa_2\pm 1$ overlap each other, and the range of $pKa_2\pm 1$ and the range of $pKa_3\pm 1$ overlap each other. Thus, in practice, it is possible to exert the pH buffer capacity in a wide pH range from 2.13 to 7.40, and if the pH of the electrolyte solution is set in the above-described range, it is possible to cause the electrolyte solution to exert the pH buffer capacity when starting to use the oxygen sensor.

However, if the pH of the electrolyte solution is excessively low, corrosion of the material of the negative electrode progresses, and the service life of the oxygen sensor is likely to be shortened. Therefore, in practice, when citric acid is used as a chelating agent, the pH of the electrolyte solution is preferably 3.5 or more, for example, and is preferably set to less than 7 in order to prevent the influence of carbonic acid gas.

Furthermore, it is considered that, in the case of citric acid, when the pH of the electrolyte solution is adjusted to the vicinity of $pKa_2$, complexes are more likely to form, and thus, the pH of the electrolyte solution is more preferably 5.75 or less, and particularly preferably 4.5 or less.

It is considered that the service life of the oxygen sensor can be further improved by increasing the concentration of the chelating agent while adjusting the pH of the electrolyte solution to the above-described suitable range.

The concentration of the chelating agent in the electrolyte solution is preferably 2.3 mol/L or higher, more preferably 2.5 mol/L or higher, and particularly preferably 2.7 mol/L or higher, for example.

There is no particular limitation thereto as long as the chelating agent has chelating action and pH buffer capacity. Specific examples of the chelating agent can include succinic acid, fumaric acid, maleic acid, citric acid, tartaric acid, glutaric acid, adipic acid, malic acid, malonic acid, aspartic acid, glutamic acid, and ascorbic acid, and these can be used alone or in combination of two or more.

From the viewpoint of increasing the chelating action, it is more preferable to use a chelating agent having high solubility in water specifically, citric acid, tartaric acid, glutamic acid, and salts thereof, and the like. More specifically, it is more preferable to use citric acid because citric acid and salts thereof are highly soluble in water (citric acid: 73 g/100 ml (25° C.), trisodium citrate: 71 g/100 ml (25° C.), and tripotassium citrate: 167 g/100 ml (25° C.)), and citric acid has a large number of dissociable hydrogen atoms, and the pH buffer capacity thereof can be exerted at multiple pH values ($pKa_1=3.13$, $pKa_2=4.75$, $pKa_3=6.40$). Therefore, when citric acid is used as a chelating agent, the service life of the oxygen sensor is further improved because citric acid is highly soluble in water and has high pH buffer capacity.

The ammonia to be contained in the electrolyte solution can be added as ammonia water, or can also be added in the form of ammonium salt, for example. Examples of the ammonium salt can include salts of ammonia and a chelating agent (diammonium hydrogen citrate, triammonium citrate, diammonium tartrate, potassium ammonium tartrate, and the like), and salts of ammonia and weak acids or strong acids, such as ammonium hydrogen carbonate, ammonium carbonate, ammonium chloride, ammonium sulfate, and diammonium hydrogen phosphate.

As described above, a suitable pH of the electrolyte solution depends on the pKa of a chelating agent to be used, but is preferably set to be in the range of each pKa±1. The pH of the electrolyte solution can be adjusted by adding ammonia and salts thereof, salts of a chelating agent (alkali metal salts and the like), basic salts other than ammonium salts, such as sodium acetate and sodium hydrogen carbonate, acids such as acetic acid, boric acid, and phosphoric acid, and salts thereof, alkali salts such as sodium hydroxide and potassium hydroxide, and the like.

As shown in FIG. 1, an electrode constituted by a catalytic electrode and a positive electrode current collector is used as the positive electrode of the oxygen sensor, for example. Although the constituent material of the catalytic electrode is not particularly limited as long as a current is generated through electrochemical reduction of oxygen on the positive electrode, redox-active catalysts such as gold (Au), silver (Ag), platinum (Pt), and titanium (Ti) are suitably used.

It is possible to use Cu, Fe, Ag, Ti, Al, Mg, Zn, Ni, and Sn, and alloys thereof as the negative electrode of the oxygen sensor. The above-described metals and alloys for constituting the negative electrode can contain other metals or impurities. Examples of such other metals and impurities can include In, Au, Bi, Na, S, Se, and Ca.

It is preferable that the negative electrode is composed of an Sn alloy. This is because an Sn alloy can suppress the generation of hydrogen during the electrochemical reduction reaction of oxygen in the oxygen sensor. Examples of the Sn alloy can include Sn—Ag alloys, Sn—Cu alloys, Sn—Ag—Cu alloys, and Sn—Sb alloys.

In the case of the Sn alloy, the Sn alloy can contain Sn and metals other than Ag, Cu, and Sb described above, such as Al, Bi, Fe, Mg, Na, Zn, S, Se, Ca, Ge, In, Ni, Co, and the like.

Also, it is possible to use, as an Sn alloy constituting the negative electrode, general lead-free solder materials (Sn-3.0Ag-0.5Cu, Sn-3.5Ag, Sn-3.5Ag-0.75Cu, Sn-3.8Ag-0.7Cu, Sn-3.9Ag 0.6Cu, Sn-4.0Ag-0.5Cu, Sn-1.0Ag-0.5Cu, Sn-1.0Ag-0.7Cu, Sn-0.3Ag-0.7Cu, Sn-0.75Cu, Sn-0.7Cu—Ni—P—Ge, Sn-0.6Cu—Ni—P—GeSn-1.0Ag-0.7Cu—Bi—In, Sn-0.3Ag-0.7Cu-0.5Bi-Ni, Sn-3.0Ag-3.0Bi-3.0In, Sn-3.9Ag-0.6Cu-3.0Sb, Sn-3.5Ag-0.5Bi-8.0In, Sn-5.0Sb, Sn-10Sb, Sn-0.5Ag-6.0Cu, Sn-5.0Cu-0.15Ni, Sn-0.5Ag-4.0Cu, Sn-2.3Ag—Ni—Co, Sn-2Ag-Cu—Ni, Sn-3Ag-3Bi-0.8Cu—Ni, Sn 3.0Ag-0.5Cu—Ni, Sn-0.3Ag-2.0Cu—Ni, Sn-0.3Ag-0.7Cu—Ni, Sn-58Bi, Sn-57Bi-1.0Ag, and the like).

The Sn alloy is more preferably an Sn—Sb alloy from the viewpoint of corrosion resistance and the like.

The content of Sb in the Sn—Sb alloy is not particularly limited as long as it does not depart from the gist of the present invention.

Also, it is preferable that the negative electrode (preferably an Sn alloy and more preferably an Sn—Sb alloy) is substantially lead free. The expression "substantially lead free" as used in this specification means that the content of Pb in the negative electrode is less than 1000 ppm. By using the negative electrode configured as such, it is possible to obtain an oxygen sensor that complies with the directive on restriction of the use of certain hazardous substances in the EU (European Union) (the so-called RoHS Directive [Restriction of the Use of Certain Hazardous Substances in Electrical and Electronic Equipment]).

As shown in FIG. 1, a barrier membrane to control the entry of oxygen is preferably disposed in the oxygen sensor so as not to allow an excess amount of oxygen to reach the positive electrode (catalytic electrode). Preferably, a barrier membrane selectively allows oxygen to pass therethrough and also can limit the amount of oxygen gas passing therethrough. The material and the thickness of the barrier membrane are not particularly limited, and a fluoropolymer such as polytetrafluoroethylene or a tetrafluoroethylene hexafluoropropylene copolymer, a polyolefin such as polyethylene, or the like can be typically used. It is possible to use porous membranes and non porous membranes, as well as membranes having holes provided with capillary tubes, which are called capillary-type membranes.

Also, as shown in FIG. 1, in order to protect the barrier membrane, it is preferable to dispose a protective film constituted by a porous resin film on the barrier membrane in the oxygen sensor. The material and thickness of the protective film are not particularly limited as long as it has a function of preventing dirt, dust, water or the like from adhering to the barrier membrane, and of allowing air (including oxygen) to pass therethrough, and a fluoropolymer such as polytetrafluoroethylene can be typically used.

The holder 20, which is an outer cover body of the oxygen sensor 1 shown in FIG. 1, can be composed of ABS resin, for example. Also, the holder lid 10 (the first holder lid 11 and the second holder lid 12) arranged on the opening portion in the holder 20 can be composed of ABS resin, polypropylene, polycarbonate, fluoropolymer, or the like, for example. Furthermore, the positive electrode current collector holding portion 70 for holding the positive electrode 50 in the holder 20, of the oxygen sensor can be composed of ABS resin, for example.

Also, the O-ring 30 interposed between the holder 20 and the holder lid 10 (the first holder lid 11) is pressed and deformed by screwing the second holder lid 12 onto the holder 20, thereby allowing the airtightness and the liquid tightness of the oxygen sensor 1 to be maintained. The material of the O-ring is not particularly limited, and nitrite rubber, silicone rubber, ethylene-propylene rubber, a fluoropolymer or the like can be typically used.

Although the present invention has been described using, as an example, a galvanic cell type oxygen sensor which is one embodiment of an oxygen sensor according to the present invention, the oxygen sensor of the present invention is not limited to the above-described embodiment, and various changes and modifications can be made within the scope of the technical idea of the invention. Also, with regard to the oxygen sensor shown in FIG. 1 as well, various changes and modifications in design can be made as long as functions as the oxygen sensor and the above-described oxygen supply pathways are provided.

Also, the oxygen sensor of the present invention can be provided as form of a potentiostatic type oxygen sensor. The potentiostatic type oxygen sensor is a sensor configured such that a constant voltage is applied between a positive electrode and a negative electrode, and the voltage to be applied is set depending on the electrochemical characteristics of the respective electrodes and the type of gas to be detected. In the potentiostatic type oxygen sensor, a current that flows between the positive electrode and the negative electrode when an appropriate constant voltage is applied therebetween is proportional to the oxygen gas concentration. Thus, by converting the current to a voltage, it becomes possible to detect the oxygen gas concentration in unknown gas by measuring the voltage, as in the case of a galvanic cell type oxygen semi:

EXAMPLES

Hereinafter, the present invention will be described more specifically with reference to the examples. However, the following examples do not limit the present invention.

Reference Example 1

Preparation of Electrolyte Solution

An electrolyte solution was prepared by dissolving citric acid and tripotassium citrate in water. Note that the molar concentration of citric acid was 1.0 mol/L, and the molar concentration of tripotassium citrate was 1.2 mol/L in the electrolyte solution. The initial pH (the pH immediately after the preparation thereof. The same applies to the following reference examples and examples.) of this electrolyte solution was 4.55 at 25° C.

Assembly of Oxygen Sensor

A galvanic cell type oxygen sensor having the configuration shown in FIG. 1 was assembled using the above-described electrolyte solution. The holder lid 10 (the first holder lid 11 and the second holder lid 12), the holder 20, and the positive electrode current collector holding portion 70 were formed of ABS resin. Also, a porous polytetrafluoroethylene sheet was used as the protective film 40, and a tetrafluoroethylene-hexafluoropropylene copolymer membrane was used as the barrier membrane 60.

The catalytic electrode 51 of the positive electrode 50 was composed of gold, and the positive electrode current collector 52 and the lead wire 120 were made of titanium, and the positive electrode current collector 52 and the lead wire 120 were welded to each other to form a single body. Also, the negative electrode 100 is composed of an Sn—Sb alloy (the Sb content was 0.3 mass %).

In the obtained oxygen sensor 1, the first holder lid 11, the O-ring 30, the protective film 40 constituted by the polytetrafluoroethylene sheet, the barrier membrane 60 formed of the tetrafluoroethylene-hexafluoropropylene copolymer membrane, the catalytic electrode 51, and the positive electrode current collector 52 were pressed against each other when the second holder lid 12 was screwed onto the holder 20, whereby they were kept in a favorable contact state. The first holder lid 11 functioned as a presser end plate, and the airtightness and the liquid tightness were secured by the O-ring 30.

Reference Example 2

An electrolyte solution having an initial pH of 4.23 at 25° C. was prepared in the same manner as that of Reference Example 1, except that the molar concentration of citric acid was changed to 12 mol/L, and the molar concentration of tripotassium citrate was changed to 1.0 mol/L, and an oxygen sensor was assembled in the same manner as that of Reference Example 1 except that the prepared electrolyte solution was used.

Reference Example 3

An electrolyte solution having an initial pH of 3.60 at 25° C. was prepared in the same manner as that of Reference Example 1, except that the molar concentration of citric acid was changed to 1.4 mol/L, and the molar concentration of tripotassium citrate was changed to 0.8 mol/L, and an oxygen sensor was assembled in the same manner as that of Reference Example 1 except that the prepared electrolyte solution was used.

Reference Example 4

An electrolyte solution having an initial pH of 3.34 at 25° C. was prepared in the same manner as that of Reference Example 1, except that the molar concentration of citric acid was changed to 1.6 mol/L, and the molar concentration of tripotassium citrate was changed to 0.6 mol/L, and an oxygen sensor was assembled in the same manner as that of Reference Example 1 except that the prepared electrolyte solution was used.

Reference Example 5

An electrolyte solution having an initial pH of 3.07 at 25° C. was prepared in the same manner as that of Reference Example 1, except that the molar concentration of citric acid was changed to 1.72 mol/L, and the molar concentration of tripotassium citrate was changed to 0.5 mol/L, and an oxygen sensor was assembled in the same manner as that of Reference Example 1 except that the prepared electrolyte solution was used.

Reference Example 6

An electrolyte solution was prepared in the same manner as that of Reference Example 1, except that the molar concentration of citric acid was changed to 2.5 mol/L, and the molar concentration of tripotassium citrate was changed to 0.5 mol/L. At the beginning of preparation, that aqueous electrolyte solution had a high temperature due to the heat of dissolution of citric acid, resulting in a uniform solution in which citric acid was completely dissolved. However, when the electrolyte solution was cooled to room temperature, citric acid was precipitated. Therefore, an oxygen sensor was not assembled and tested for the electrolyte solution of Reference Example 6.

Accelerated life testing was performed by passing oxygen gas at a concentration of 100% through each of the oxygen sensors of Reference Examples 1 to 5 at a temperature of 40° C. Electrochemical reactions at 40° C. proceed about twice as fast as those at room temperature. Also, electrochemical reactions when oxygen gas at a concentration of 100% is passed through the oxygen sensor proceed about 5 times as fast as those in the air. Accordingly, when oxygen gas at a concentration of 100% is passed through an oxygen sensor at a temperature of 40° C., this accelerated life testing can determine the service lives of the oxygen sensors about 10 times faster than in the case where they are allowed to stand at room temperature in the air. In this testing, the voltages output by the oxygen sensors were measured, a point of time when the output voltage decreased to 90% of the voltage output when measurement was started was regarded as the service lives thereof and the performance of the oxygen sensors was evaluated by the period of time until the service life ended (measurable time period).

Table 1 shows the compositions of the electrolyte solutions in Reference Examples 1 to 6, and the results of the above-described evaluations of the oxygen sensors of Reference Examples 1 to 5. Note that the measurable time period of each oxygen sensor is shown by using a relative value where the measurable time period of the oxygen sensor of Reference Example 1 was 100 in Table 1. Also, the molar concentration of citric acid in the electrolyte solution of Reference Example 6 indicates the concentration thereof in the high-temperature electrolyte solution at the beginning of preparation.

TABLE 1

| | Composition of Electrolyte Solution (mol/L) | | | Measurable |
|---|---|---|---|---|
| | Citric Acid | Tripotassium Citrate | Initial pH | Time Period |
| Ref. Ex. 1 | 1.0 | 1.2 | 4.55 | 100 |
| Ref. Ex. 2 | 1.2 | 1.0 | 4.23 | 187 |
| Ref. Ex. 3 | 1.4 | 0.8 | 3.60 | 131 |
| Ref. Ex. 4 | 1.6 | 0.6 | 3.34 | 95 |
| Ref. Ex. 5 | 1.72 | 0.5 | 3.07 | 55 |
| Ref. Ex. 6 | 2.5 | 0.5 | — | — |

The oxygen sensors of Reference Examples 1 to 3 operated for a long period of time due to the initial pH of the electrolyte solutions being set to a suitable range (3.5 to 5.75). In particular, with Reference Example 2 that was in a range (3.75 to 4.5) where the pH buffer capacity of the electrolyte solution was more likely to be exerted, the oxygen sensor with a longer service life was constructed.

On the other hand, with the oxygen sensors of Reference Examples 4 and 5 in which the initial pH of the electrolyte solutions was lower than 3.5, a shortened service life, which is presumed to be influenced by corrosion of Sn in the negative electrode, was observed.

Also, when the concentration of tripotassium citrate was 0.5 mol/L, the concentration of citric acid was limited to up to about 1.8 mol/L (Reference Example 5) at room temperature.

Example 1

An electrolyte solution was prepared by dissolving citric acid, tripotassium citrate, and ammonia in water, and an oxygen sensor was assembled in the same manner as that of Reference Example 1, except that the prepared electrolyte solution was used. Note that the molar concentration of citric acid was 2.5 mol/L, the molar concentration of tripotassium citrate was 0.5 mol/L, and the molar concentration of ammonia was 3.0 mol/L in the electrolyte solution. The initial pH of the electrolyte solution at 25° C. was 4.30.

Example 2

An electrolyte solution was prepared by dissolving citric acid, potassium acetate, and ammonia in water, and an oxygen sensor was assembled in the same manner as that of Reference Example 1, except that the prepared electrolyte solution was used. Note that the molar concentration of citric acid was 2.5 mol/L, the molar concentration of potassium acetate was 1.0 mol/L, and the molar concentration of ammonia was 3.0 mol/L in the electrolyte solution. The initial pH of the electrolyte solution at 25° C. was 4.32.

Example 3

An electrolyte solution having an initial pH of 4.36 at 25° C. was prepared in the same manner as that of Example 2, except that the molar concentration of citric acid was changed to 2.6 mol/L, and the molar concentration of ammonia was changed to 3.3 mol/L, and an oxygen sensor was assembled in the same manner as that of Reference Example 1 except that the prepared electrolyte solution was used.

Example 4

An electrolyte solution having an initial pH of 4.39 at 25° C. was prepared in the same manner as that of Example 2, except that the molar concentration of potassium acetate was changed to 1.5 mol/L, and the molar concentration of ammonia was changed to 2.5 mol/L, and an oxygen sensor was assembled in the same manner as that of Reference Example 1 except that the prepared electrolyte solution was used.

Example 5

An electrolyte solution having an initial pH of 4.43 at 25° C. was prepared in the same manner as that of Example 3, except that the molar concentration of potassium acetate was changed to 1.5 mol/L, and the molar concentration of ammonia was changed to 2.8 mol/L, and an oxygen sensor was assembled in the same manner as that of Reference Example 1 except that the prepared electrolyte solution was used.

Comparative Example 1

The oxygen sensor of Reference Example 5 was used as a comparative example for comparison with the oxygen sensor of Example 1 in which the electrolyte solution containing tripotassium citrate at a concentration of 0.5 mol/L and further containing ammonia was used.

With regard to the oxygen sensors of the examples and the comparative example, the accelerated life testing was performed under the same conditions as those of the reference examples, and the performance of the oxygen sensors was evaluated.

Table 2 shows the compositions of the electrolyte solutions in the oxygen sensors, and the results of the above-described evaluations. Note that the measurable time period of each oxygen sensor is shown in fable 2 using a relative value where the measurable time period of the oxygen sensor of Comparative Example 1 was 100.

TABLE 2

| | Composition of Electrolyte Solution (mol/L) | | | | | Measurable |
|---|---|---|---|---|---|---|
| | Citric Acid | Tripotassium Citrate | Potassium Acetate | Ammonia | Initial pH | Time Period |
| Ex. 1 | 2.5 | 0.5 | 0 | 3.0 | 4.30 | 473 |
| Ex. 2 | 2.5 | 0 | 1.0 | 3.0 | 4.32 | 370 |
| Ex. 3 | 2.6 | 0 | 1.0 | 3.3 | 4.36 | 357 |
| Ex. 4 | 2.5 | 0 | 1.5 | 2.5 | 4.39 | 299 |
| Ex. 5 | 2.6 | 0 | 1.5 | 2.8 | 4.43 | 300 |
| Comp. Ex. 1 | 1.72 | 0.5 | 0 | 0 | 3.07 | 100 |

Because the electrolyte solution used in the oxygen sensor of Example 1 contained ammonia, the concentration of citric acid in the electrolyte solution of Example 1 was able to be increased to more than the concentration of citric acid in the electrolyte solution used in the oxygen sensor of Comparative Example 1, and, even if the concentration of citric acid was 2.5 mol/L, a stable dissolved state was maintained at room temperature.

Similarly, in the electrolyte solutions used in the oxygen sensors of Examples 2 to 5, the concentration of citric acid was able to be increased to 2.5 to 2.6 mol/L at room temperature due to the electrolyte solutions containing ammonia.

Furthermore, with Examples 1 to 5, because the initial pH of the electrolyte solutions was able to be adjusted to a suitable range, the measurable time period was able to be significantly extended compared to the oxygen sensor of Comparative Example 1 due to the effect obtained together with the above-described increase in the concentration of citric acid, thus obtaining an oxygen sensor with a longer service life.

The invention can be embodied in other foams without departing from the spirit thereof. The embodiments disclosed in this application are examples, and the present invention is not limited to these embodiments. The scope of the invention is indicated by the appended claims rather than by the foregoing description, and all changes that come within the meaning and range of equivalency of the claims are intended to be embraced therein.

INDUSTRIAL APPLICABILITY

An electrochemical oxygen sensor according to the present invention is applicable to the same applications as conventionally known electrochemical oxygen sensors.

DESCRIPTION OF REFERENCE NUMERALS

1 Electrochemical oxygen sensor
10 Holder lid
11 First holder lid (inner lid)
12 Second holder lid (outer lid)
20 Holder
30 O-ring
40 Protective film
50 Positive electrode
51 Catalytic electrode
52 Positive electrode current collector
60 Bather membrane
70 Positive electrode current collector holding portion
80 Bore for supplying electrolyte solution
90 Bore for lead wire
100 Negative electrode
110 Electrolyte solution
120 Lead wire
130 Correction resistor
140 Temperature compensation thermistor
150 Through-hole

The invention claimed is:

1. An electrochemical oxygen sensor comprising:
a positive electrode;
a negative electrode; and
an electrolyte solution,
wherein the electrolyte solution comprises a chelating agent and ammonia,
wherein the electrolyte solution comprises citric acid as the chelating agent, and
wherein a concentration of the ammonia in the electrolyte solution is 0.01 mol/L or higher.

2. The electrochemical oxygen sensor according to claim 1,
wherein a concentration of the chelating agent in the electrolyte solution is 2.3 mol/L or higher.

3. The electrochemical oxygen sensor according to claim 1,
wherein the electrolyte solution further comprises an alkali metal salt of the chelating agent.

4. The electrochemical oxygen sensor according to claim 1,
wherein the electrolyte solution has a pH of 3.5 to 5.75.

5. The electrochemical oxygen sensor according to claim 1,
wherein the negative electrode comprises Sn or an Sn alloy.

6. The electrochemical oxygen sensor according to claim 1,
wherein the negative electrode comprises an Sn alloy, and
wherein the Sn alloy comprises at least one element selected from the group consisting of Ag, Cu, and Sb.

7. A The electrochemical oxygen sensor according to claim 1,
wherein the electrolyte solution further comprises at least one compound selected from the group consisting of acetic acid, boric acid, phosphoric acid, and salts thereof.

8. The electrochemical oxygen sensor according to claim 1,
wherein the electrolyte solution has a pH of 7.40 or less.

9. The electrochemical oxygen sensor according to claim 1,
wherein the concentration of the ammonia in the electrolyte solution is 0.1 mol/L or higher.

10. The electrochemical oxygen sensor according to claim 1,
wherein a content of Pb in the negative electrode is less than 1000 ppm.

11. An electrochemical oxygen sensor comprising:
a positive electrode;
a negative electrode; and
an electrolyte solution,
wherein the negative electrode comprises Sn or an Sn alloy,
wherein the electrolyte solution comprises a chelating agent and ammonia, and
wherein a concentration of the ammonia in the electrolyte solution is 0.01 mol/L or higher.

12. The electrochemical oxygen sensor according to claim 11,
wherein a concentration of the chelating agent in the electrolyte solution is 2.3 mol/L or higher.

13. The electrochemical oxygen sensor according to claim 11,
wherein the electrolyte solution further comprises an alkali metal salt of the chelating agent.

14. The electrochemical oxygen sensor according to claim 11,
wherein the electrolyte solution has a pH of less than 7.

15. The electrochemical oxygen sensor according to claim 11,
wherein the negative electrode comprises an Sn alloy, and
wherein the Sn alloy comprises at least one element selected from the group consisting of Ag, Cu, and Sb.

16. The electrochemical oxygen sensor according to claim 11,
wherein the electrolyte solution further comprises at least one compound selected from the group consisting of acetic acid, boric acid, phosphoric acid, and salts thereof.

17. The electrochemical oxygen sensor according to claim 11,
wherein the concentration of the ammonia in the electrolyte solution is 0.1 mol/L or higher.

18. The electrochemical oxygen sensor according to claim 11,
wherein a content of Pb in the negative electrode is less than 1000 ppm.

* * * * *